No. 708,720. Patented Sept. 9, 1902.
A. KÖNIG.
PRISMATIC SIGHTING TELESCOPE.
(Application filed Nov. 14, 1901.)

(No Model.) 2 Sheets—Sheet 1.

Witnesses:
Emil Dönitz
Paul Krüger

Inventor:
Albert König

No. 708,720.  
A. KÖNIG.  
PRISMATIC SIGHTING TELESCOPE.  
(Application filed Nov. 14, 1901.)  
(No Model.)  
Patented Sept. 9, 1902.  
2 Sheets—Sheet 2.

Witnesses  
Emil Dönitz  
Paul Krüger

Inventor  
Albert König

UNITED STATES PATENT OFFICE.

ALBERT KÖNIG, OF JENA, GERMANY, ASSIGNOR TO FIRM OF CARL ZEISS, OF JENA, GERMANY.

PRISMATIC SIGHTING-TELESCOPE.

SPECIFICATION forming part of Letters Patent No. 708,720, dated September 9, 1902.

Application filed November 14, 1901. Serial No. 82,328. (No model.)

*To all whom it may concern:*

Be it known that I, ALBERT KÖNIG, doctor of philosophy, a subject of the King of Prussia, residing at Carl Zeiss Strasse, Jena, in the Grand Duchy of Saxe-Weimar, German Empire, have invented a new and useful Prismatic Sighting-Telescope, of which the following is a specification.

The invention relates to sights for rifles and other small guns; and it consists of a prismatic sighting-telescope (a prismatic telescope having a reticle or similar device in the focus of the object-glass) in which the eyepiece is inclined to the object-glass at such an angle that their axes bisect or cross each other in front of the object-glass. A prismatic telescope of this description when suitably—*i. e.*, object-glass above and eyepiece below—fitted on a rifle compels the marksman to direct his glance upward corresponding to the inclination of the eyepiece instead of looking, as with the parallel-vision prismatic sighting-telescope, ahead in the direction toward the object; but this comparatively insignificant drawback of the amended rifle-sighting telescope is more than counterbalanced by its specific advantage, which is the object of the present invention and consists in a considerable reduction in the size of the prism-casing, and by consequence in the weight and cost of the instrument in comparison to the parallel-vision prismatic sighting-telescope having the same effect—*i. e.*, the same elevation of the axis of the object-glass above the aiming-eye. This elevation constitutes already the superiority of the parallel-vision prismatic sighting-telescope over the common direct-vision-lens sighting-telescope, because it raises the cone of the field of view clear of the obstructing fore end of the firearm.

Figure 2:
Figure 4:
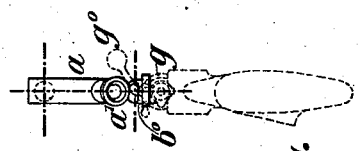
Figure 1:
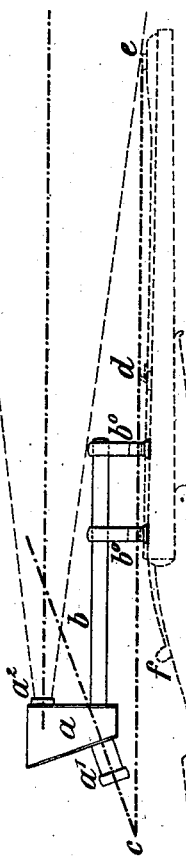
Figure 3:
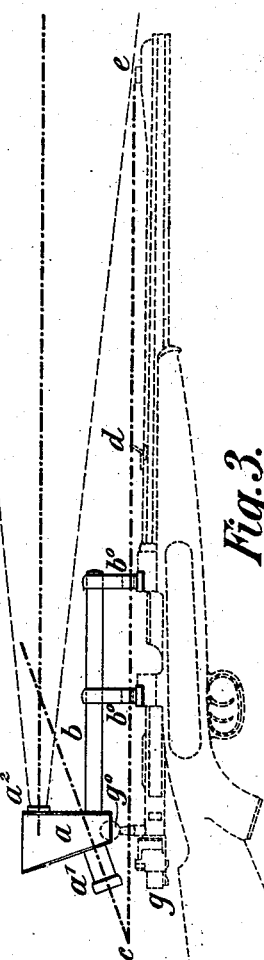
Figure 6:
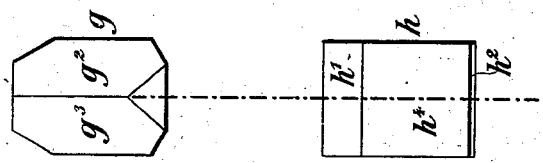
Figure 5:
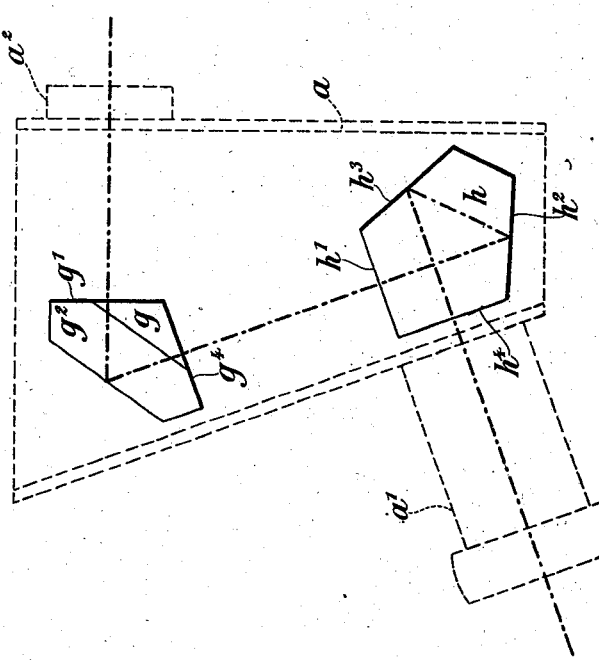

In the accompanying drawings, Figure 1 is a side view of the improved sighting-telescope attached to an ordinary hunting-gun. Fig. 2 is a back view of the same. Fig. 3 is a side view of the telescope attached to a Mauser repeating-rifle. Fig. 4 is a back view of the same. Fig. 5 is a side view of a prism combination adapted to realize the invention. Fig. 6 is a back view of the same.

In the example shown in Figs. 1 and 2 the prism-casing $a$, having the inclined eyepiece $a'$ at the back and the object-glass $a^2$ in front, is attached to a tube $b$, joined to the breech of the gun by means of the feet $b^0$. The eye-center $c$ is situated in the usual line of sight determined by back sight $d$ and fore sight $e$. The object-glass $a^2$ lies at such a level that the fore sight $e$ remains below the cone of the field of view, which is indicated in Fig. 1 by the divergent dotted lines. It will be understood that rotating the eyepiece-axis about the eye-center $c$ into the line of sight $c\,d\,e$ while the object-glass axis remains at its level would establish the arrangement of the parallel-vision prismatic sighting-telescope, but at the same time necessitates a considerable downward prolongation of the prism-casing $a$. The breech-closing lever $f$ would also be less accessible if the prism-casing $a$ reached much farther down.

In the example of Figs. 3 and 4 the eye-center $c$ lies also in the direction of the line of sight $d\,e$. Again, assuming the eyepiece-axis being rotated about $c$ into a position parallel to the object-glass axis and coinciding with the line $c\,d\,e$ there would be no possibility of proportionally extending downward the prism-casing $a$, as the requisite space is already occupied by the bolt $g^0$, Fig. 4, of the breech action $g$ when fully drawn back, as shown in Fig. 3. Hence when a rifle of this or like construction is used the position of the aiming-eye could not be so low—*i. e.*, the head could not be held in such a comfortable position with a parallel-vision prismatic sighting-telescope as with the improved one.

The invention can be realized with every type of prism combination for reërecting the image; but the ordinary parallel-vision arrangement of such prism system must be adapted to the inclination of the eyepiece-axis by altering the position of the surface of entrance (or that of emergence) and that of at least one of the reflecting-surfaces. Any optician can readily design these alterations, whatever the type of prism combination may be. Besides, such modification will not result in any defects in the images obtained, as would be the case if an ordinary direct-vision-lens telescope were provided with an inclined eyepiece by simply inserting a prism.

The reërecting prism system shown in Figs.

5 and 6 is well known in its ordinary parallel-vision arrangement, from which it only differs by the shape of the prism $g$. This prism being a so-called "Amici" prism re-erects the image. The rays after having passed the surface of entrance $g'$ are twice reflected—one half by the surfaces $g^2$ and $g^3$ successively and the other half by the surfaces $g^3$ and $g^2$ successively. The final deflection of the axial ray produced by this prism is less than the ordinary value of ninety degrees, because the inclination of the couple of reflecting-surfaces $g^2$ and $g^3$ to the surface of entrance $g'$ and the inclination of the surface of emergence $g^4$ to this surface $g'$ have been suitably altered. The pentagonal prism $h$, well known as "Prandl's" prism, having the surface of entrance $h'$, the two silvered reflecting-surfaces $h^2$ and $h^3$, and the surface of emergence $h^4$, is not altered, the final deflection of the axial ray produced by this prism being ninety degrees.

What I claim as my invention, and desire to secure by Letters Patent, is—

A prismatic sighting-telescope for rifles and other small arms having the eyepiece-axis and the object-glass axis in such a way inclined to each other, that they are more distant from each other behind the eyepiece than before the object-glass, essentially as described.

In testimony whereof I have signed my name to this specification in the presence of two subscribing witnesses.

ALBERT KÖNIG.

Witnesses:
 EMIL DÖNITZ,
 PAUL KRÜGER.